United States Patent
Assel (10) Patent No.: US 10,801,816 B2
(45) Date of Patent: Oct. 13, 2020

(54) MISSILE DETECTOR AND A METHOD OF WARNING OF A MISSILE

(71) Applicant: HENSOLDT SENSORS GMBH, Taufkirchen (DE)

(72) Inventor: Michael Assel, Kissing (DE)

(73) Assignee: HENSOLDT SENSORS GMBH, Taufkirchen (DE)

( * ) Notice: Subject to any disclaimer, the term of this patent is extended or adjusted under 35 U.S.C. 154(b) by 0 days.

(21) Appl. No.: 16/451,196

(22) Filed: Jun. 25, 2019

(65) Prior Publication Data

US 2020/0080821 A1     Mar. 12, 2020

(30) Foreign Application Priority Data

Jul. 5, 2018 (EP) .................................. 18 181 987

(51) Int. Cl.
| | | |
|---|---|---|
| *G08B 21/00* | (2006.01) | |
| *F41H 11/02* | (2006.01) | |
| *G01J 1/42* | (2006.01) | |
| *G08B 25/00* | (2006.01) | |
| *G08B 29/18* | (2006.01) | |

(52) U.S. Cl.
CPC .............. *F41H 11/02* (2013.01); *G01J 1/429* (2013.01); *G01J 1/4228* (2013.01); *G08B 25/002* (2013.01); *G08B 29/185* (2013.01)

(58) Field of Classification Search
CPC ..... F41H 11/02; G08B 29/185; G08B 25/002; G01J 1/429; G01J 1/4228; G01S 3/78
USPC ......................................................... 340/540
See application file for complete search history.

(56) References Cited

U.S. PATENT DOCUMENTS

| | | | |
|---|---|---|---|
| 3,653,016 A | 3/1972 | Cormier | |
| 5,686,889 A | 11/1997 | Hillis | |
| 2013/0235211 A1 | 9/2013 | Fontanella | |
| 2015/0143982 A1* | 5/2015 | Rovinsky | F41G 7/30 |
| | | | 89/1.11 |
| 2015/0242702 A1* | 8/2015 | Aphek | G06K 9/00476 |
| | | | 382/113 |

FOREIGN PATENT DOCUMENTS

| | | |
|---|---|---|
| EP | 2911092 A1 | 8/2015 |
| WO | 2006083278 A2 | 8/2006 |
| WO | 2007056753 A2 | 5/2007 |

OTHER PUBLICATIONS

Extended European Search Report dated Dec. 6, 2018 in related/corresponding EP Application No. 18 181 987.1.

* cited by examiner

*Primary Examiner* — Tanmay K Shah
(74) *Attorney, Agent, or Firm* — Patent Portfolio Builders PLLC (57) ABSTRACT

A missile detector includes a primary sensor for detecting a potential missile in a first spectral range, a secondary sensor for detecting the potential missile in a second spectral range, and an evaluation unit. The evaluation unit receives first detection signals from the primary sensor and compares them with a threshold value. When the threshold value has been exceeded, a warning signal of the potential missile is issued. Second detection signals from the secondary sensor are continuously received and stored for a predetermined period of time, in order to perform a verification of the potential missile based on a traceback when the warning signal is present. The traceback involves analysis of the stored sensor signals of the secondary sensor.

12 Claims, 5 Drawing Sheets

MISSILE DETECTOR AND A METHOD OF WARNING OF A MISSILE

CROSS-REFERENCE TO RELATED APPLICATIONS

The present application claims priority under 37 C.F.R. § 1.55 to EP 18 181 987.1, filed Jul. 5, 2018, the entire disclosure of which is herein expressly incorporated by reference.

FIELD OF INVENTION

The present invention relates to a missile detector and to a method of warning of a missile, and more particularly to a passive optical missile detector using two spectral ranges.

BACKGROUND OF THE INVENTION

Missile detectors are a necessary part of self-defense systems (e.g. aircraft) whose primary task is the detection and declaration of missiles. Since such missiles may pose a potential danger to a carrier (e.g. a moving or non-moving object), upon detection, a message is sent to a corresponding higher-level system in order to be able to initiate appropriate countermeasures.

Passive missile detector systems may be based, for example, on optical signals—for example, by detecting the hot jetwash of the missile. For this purpose, for example, one or more spatially resolving cameras may be used, which operate in a special spectral range. Basically, however, such cameras detect all objects that are located in a detection space and have a signature in the spectral range of the camera. Among them are often a variety of non-threatening sources, such as a fire, halogen lamps or also missiles that would not hit the carrier itself. Rather, the real threat is in missiles, which move towards the respective carrier and therefore may pose a threat in principle.

A distinction between threatening sources and non-threatening sources is made within a classifier. For this purpose, for example, characteristic features are used (e.g. an intensity curve), which belong to the source in question. As a result of the classification, only actual threats are detected and reported to an appropriate self-defense system of the carrier and/or the pilot for further countermeasures.

When adjusting the classifier, there is typically a trade-off between a low false alarm rate (FAR) and a maximum probability of declaration of threats (POD).

Figure 4:
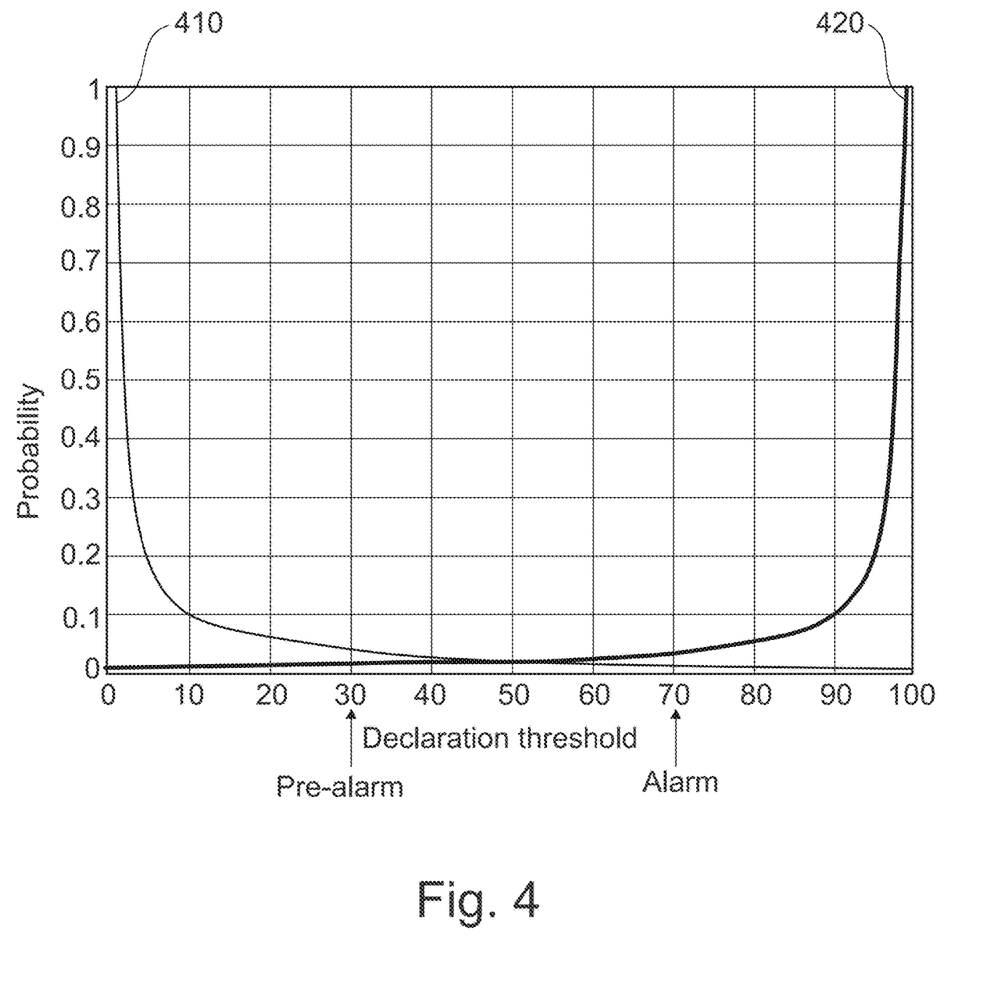
FIG. 4 shows a schematic relationship between FAR and POD.

FIG. 4 illustrates the schematic relationship between the false alarm rate (FAR) and the probability of declaration of threats (POD). In a first graph 410, non-threatening objects are shown, which are falsely declared as an alarm. They thus represent the false alarm probability (FAR). A second graph 420 shows threatening objects that have not been declared as alarms. This graph 420 thus represents the probability (1-POD). A threshold value is used for the declaration, wherein a first low threshold value (e.g. at 30%) triggers a pre-alarm and a second higher threshold value (e.g. at 70%) triggers an alarm. If the threshold were equal to zero (left side of the illustration), all objects would trigger an alarm. Because of this, all non-dangerous objects trigger an alarm/pre-alarm. As the threshold increases, the FAR falls (see first graph 410) and the probability value (1-POD) (second graph 420) increases. A threshold of 100 (as a percentage of the range of sensor signals) means that all objects are declared non-threatening. As the threshold falls, there are fewer and fewer dangerous objects for which no warning occurs (see second graph 420).

The higher the declaration threshold, the lower the false alarm rate. At the same time, it also increases the likelihood that an actual threat will be misinterpreted as a false alarm and therefore suppressed. The same applies to the case when the declaration threshold is set too low, which leads to many false alarms—but reports a high probability of an actual threat.

If the possible countermeasures are limited, it is in any case advantageous to avoid high false alarm rates, since otherwise there is a danger that no countermeasures will be available in the event of an actual threat. Exceptions to this would be countermeasures that are not consumed, such as so-called DIRCM (direct infrared counter measures). If a carrier is protected by such systems, a higher false alarm rate may be accepted for a missile detector in favor of the warning time or in favor of the POD. This may be taken into account, for example, by means of suitable early warnings. With a low declaration threshold, such early warnings result in a shorter declaration time and/or a higher POD at a higher FAR.

In addition to detection of being under fire, such as from missiles, missile detectors may also be used to detect enemy fire comprising non-propelled projectiles (HFI: Hostile Fire Indication). Depending on the spectral range, the muzzle flash, the hot bullet or, in the case of tracer ammunition, the tracer track is detected.

For example, one known system is disclosed in U.S. Pat. No. 3,653,016, which combines a broadband solar cell detector with a UV-sensitive detector through a serial interconnection to allow confirmation of an event previously detected by the solar cell detector. However, the results for this system are still unsatisfactory.

Therefore, there is a need for improved systems that do not have the problems described above and offer a high degree of security.

SUMMARY OF THE INVENTION

The present invention relates to a missile detector, and more particularly to a passive missile detector. The missile detector comprises a primary sensor, a secondary sensor, and an evaluation unit. The primary sensor is configured to detect a potential missile in a first spectral range. The secondary sensor is configured to detect the potential missile in a second spectral range. The first spectral range and the second spectral range are optionally different and selected such that a false alarm rate of the primary sensor is less than a false alarm rate of the secondary sensor. The evaluation unit is designed to receive first detection signals from the primary sensor and to generate (or output) a warning signal (e.g. a pre-alarm) with respect to the potential missile after exceeding a declaration threshold value (e.g. in a classifier). The evaluation unit is further configured to continuously receive second detection signals from the secondary sensor and to store them for a predetermined period of time and, if the warning signal is present, to verify the potential missile based on a traceback, wherein the traceback includes an analysis of the stored sensor signals of the secondary sensor.

It is understood that the evaluation unit may have a plurality of components and may be at least partially part of the primary sensor and/or the secondary sensor. For example, comparison with thresholds may be performed in the primary sensor and/or in the secondary sensor itself. The storage of sensor signals may optionally be done in one of the sensors. However, it is also possible that the storage and the analysis are performed by an external unit/memory.

The term "potential" refers in particular to potentially dangerous flying objects such as projectiles or missiles. Such objects generate signals that are to be distinguished from other signals (e.g. a stationary background).

The declaration threshold does not necessarily refer directly to the intensity of pixels obtained from the sensors. Rather, an analysis of the detected events (e.g. over time) takes place in the evaluation unit, so that the declaration threshold relates, for example, to derived variables (e.g. how fast the intensity of pixels changes with time).

Optionally, the evaluation unit is further configured to output at least one of the following alarms:
- a warning after a declaration signal has been triggered by the primary sensor (e.g. when reaching or exceeding a declaration threshold value),
- an alarm upon verification of the detection event by the secondary sensor,
- an alarm on reaching a further declaration threshold, which is greater than the warning declaration threshold.

The triggering of the warning or the alarm may occur immediately after the exceeding of the declaration threshold values has been detected. The concrete choice for the (further) declaration threshold represents an optimization problem in order to combine a low false alarm rate with a high reliability (high POD). For example, the declaration threshold may be 30 and trigger an early warning (higher FAR at higher POD). At the further declaration threshold of 70, for example, an alarm (lower FAR at a lower POD) may be output.

Optionally, the evaluation unit is further configured to issue an alarm in response to a positive verification only if the signal received by the primary sensor remains above the first threshold value for a certain period of time.

Optionally, the primary sensor is further configured to also detect a position (in the detection image) of the potential missile (e.g. its coordinates and/or its direction/angular range) when detecting the potential missile and forward it to the evaluation unit. In the following, under a position is to be understood in particular always also the position in the detected image and not necessarily the three global space coordinates. Since the sensor "looks" in a certain direction, this position generally always defines a certain direction.

Optionally, the evaluation unit is further configured to analyze the stored sensor signals of the secondary sensor for a local area around the detected position (in the captured image). This is to be understood in particular as a spatial filtering, so that only areas are analyzed that are in the vicinity of the detected position. The secondary sensor may also perform location or direction detection for all candidate missiles and, based on the transmitted position from the candidates, select an object to trace back the data.

Optionally, the evaluation unit is further configured to delete sensor signals of the secondary sensor, which are outside the predetermined period of time. The predetermined period of time may depend on an expected time of flight of the potential missile to an object to be warned by the missile detector. For example, the predetermined period of time may be in a range between 10 seconds and 60 seconds, or between 15 seconds and 50 seconds, or may be about 20 seconds or about 30 seconds. As is generally customary, the term "delete" should not necessarily mean the physical deletion, but only the enabling for overwriting the corresponding data area. The specified time ranges are only examples. It is understood that the time range is particularly adjustable and may be adapted to the specific circumstances and to the expected missile or its speed.

Optionally, the evaluation unit is further configured to perform a classification of a potential missile detected by the primary sensor, wherein the classification is based on a measure of exceeding an attribute (e.g. an intensity distribution) of the declaration threshold and indicating the probability of an absence of a false alarm.

A potentially hazardous missile has a particular missile signature and the evaluation unit may be further configured to compare at least portions of the second sensor signals received by the secondary sensor with the particular missile signature to classify the missile as potentially dangerous (e.g. as part of the classification).

Optionally, the evaluation unit is further configured to perform the traceback in time to a possible firing event (launch). The firing event may be a time localized maximum in the sensor data (e.g. a first explosive, strong signal from the respective position). However, the firing event may also be—within the traceback time period—the first detected signal from the respective image area (it need not be a localized maximum).

Optionally, the secondary sensor has a greater reach than the primary sensor. The first spectral range of the primary sensor may be in the ultraviolet range, for example, so that it is not sensitive to solar signals. However, due to atmospheric absorption, the reach of this sensor is limited. Due to the lack of image background, detecting the threat is easier, resulting in a low FAR. The second spectral range of the secondary sensor may comprise at least one of the following spectral ranges: visible spectral range, near infrared (e.g. wavelengths between 800 nm and 3 μm) or medium infrared (e.g. wavelengths between 3 μm and 50 μm). These spectral ranges are characterized in that the atmospheric damping is low and thus a long reach may be achieved. Due to the background image information, however, this leads to an increased FAR.

Optionally, the evaluation unit is further configured to store only those detected sensor signals from the secondary sensor which are above a further threshold value. These signals may also be continuously compressed and stored as compressed image data. The primary sensor and/or the secondary sensor are optionally designed to perform a local or global segmentation in real time and to transmit only object data to the evaluation unit.

The present invention also relates to a method of warning of a missile. The method comprises the following steps:
- Detecting a potential missile by a primary sensor using first sensor signals in a first spectral range, the detecting comprising comparing the first sensor signals comprising a threshold value and, after exceeding the threshold value, generating a warning signal of the potential missile,
- Detecting the potential missile by a secondary sensor using second sensor signals in a second spectral range, wherein the second sensor signals are continuously received by the secondary sensor and stored for a predetermined period of time and a false alarm rate of the primary sensor is less than a false alarm rate of the secondary sensor; and
- comprises verifying the potential missile in the presence of the warning signal based on a traceback comprising an analysis of the stored sensor signals of the secondary sensor.

Optionally, the steps of detecting include detecting first and second sensor signals generated by the missile. It is therefore in particular a missile warning, where no signals need to be sent out (passive detector). Any existing filters filter the expected wavelength range.

BRIEF DESCRIPTION OF THE FIGURES

The exemplary embodiments of the present invention will be better understood from the following detailed description and the accompanying drawings, which should not be construed as limiting the disclosure to the specific embodiments but are for explanation and understanding only.

DETAILED DESCRIPTION

Figure 1:
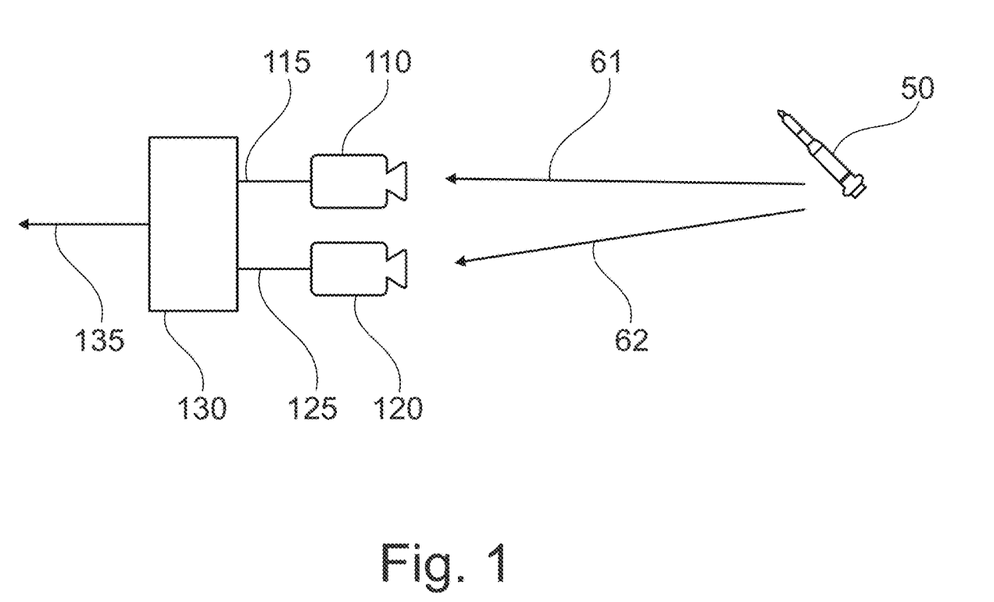
FIG. 1 shows a missile detector according to an exemplary embodiment of the present invention.

FIG. 1 shows an exemplary embodiment of a missile detector according to an exemplary embodiment of the present invention. The missile detector comprises a primary sensor 110, a secondary sensor 120, and an evaluation unit 130. The primary sensor 110 is configured to detect a potential missile 50 using first sensor signals 61 in a first spectral range. The secondary sensor 120 is configured to detect the potential missile 50 using second sensor signals 62 in a second spectral range, wherein the first spectral range and the second spectral range are selected such that a false alarm rate of and the reach of the primary sensor 110 is less than a false alarm rate of and the reach of the secondary sensor 120. The evaluation unit 130 is configured:
  to receive first detection signals 115 from the primary sensor 110 and to compare them with a threshold value S1 and to generate a warning signal from the potential missile 50 after exceeding the threshold value S1,
  to continuously receive second detection signals 125 from the secondary sensor 120 and to store them for a predetermined period of time,
  to perform a verification of the potential missile 50 based on a traceback when the warning signal is present, the traceback comprising an analysis of the stored sensor signals of the secondary sensor 120. Optionally, traceback only requires examining a small spatial area around the position reported by the primary sensor. For this reason—compared to the conventionally used detection threshold for the evaluation of the entire image—a lower detection threshold may be selected, since fewer sources are contained in the observation area than in the entire image.

Exemplary embodiments relate in particular to passive missile detectors which use optical sensors such as cameras as primary and secondary sensors 110, 120. The cameras in question operate in two wavelength ranges that offer different advantages and disadvantages when it comes to detecting threats. For example, consider:
  SBUV (solar blind UV): Ultraviolet (UV) cameras/sensors that are insensitive to sunlight;
  MWIR (mid wave Infra Red): Cameras/sensors for the middle infrared range.

The solar-light-insensitive SBUV sensors operate in a spectral range in which radiation from the sun is absorbed in the atmosphere. For this reason, images are obtained that contain no further image information apart from very hot objects such as fire, halogen lamps, missiles, etc. A detection of these sources is therefore very easy.

Since only very hot objects are detected and no sun reflexes exist, the number of sources to be processed in the classifier (part of the evaluation unit 130) is very small. When designing the missile detector, it should be noted that the radiated intensity of the missile engine in this wavelength range is very low and the atmospheric damping is high. Because of these two properties, the reach of a UV-based missile detector is limited. However, for the biggest threat of flying equipment (e.g. shoulder-fired air defense missiles), the time between the warning and the potential hit (warning time) is sufficient to take appropriate countermeasures. These sensors are particularly suitable for the primary sensor 110 because they have a low FAR and a high POD.

The mid-infrared (MWIR) is the second common spectral range used in optical missile detectors. The use of this spectral range offers the principal advantage that the reach is very high due to the good atmospheric transmission and high intensity of the jetwash. In the design of the missile detector, it should be noted here that reflections and scattering of sunlight at surrounding structures are observed at these wavelengths, just as the thermal self-radiation of objects is also detected. Due to the structured background (clutter), therefore, the detection of the hot engine exhaust gases of the missile 50 is much more difficult than in the SBUV. Therefore, in general, very many objects have to be tracked and evaluated in the classifier (evaluation unit) with regard to their threat potential, which may lead to an increased FAR. In order to keep the total number of objects 50 to be tracked within a manageable range, the threshold S1 must be set correspondingly high in the detection of the objects in the image. On the other hand, however, this leads to a reduction of the reach, so that the above-mentioned advantage of the greater reach may be relativized again.

In order to further reduce the detected number of objects, two-color MWIR systems may be used. Different spectral ranges are recorded and the additional spectral information is used to further suppress the background.

The MWIR cameras (e.g. for the secondary sensor 120) thereby allow detection of enemy fire (e.g. non-propelled projectiles), wherein both tracer and non-tracer ammunition may be detected through the temperature increase of the bullet during the flight. Likewise, a muzzle flash may be reliably detected.

Figure 2:
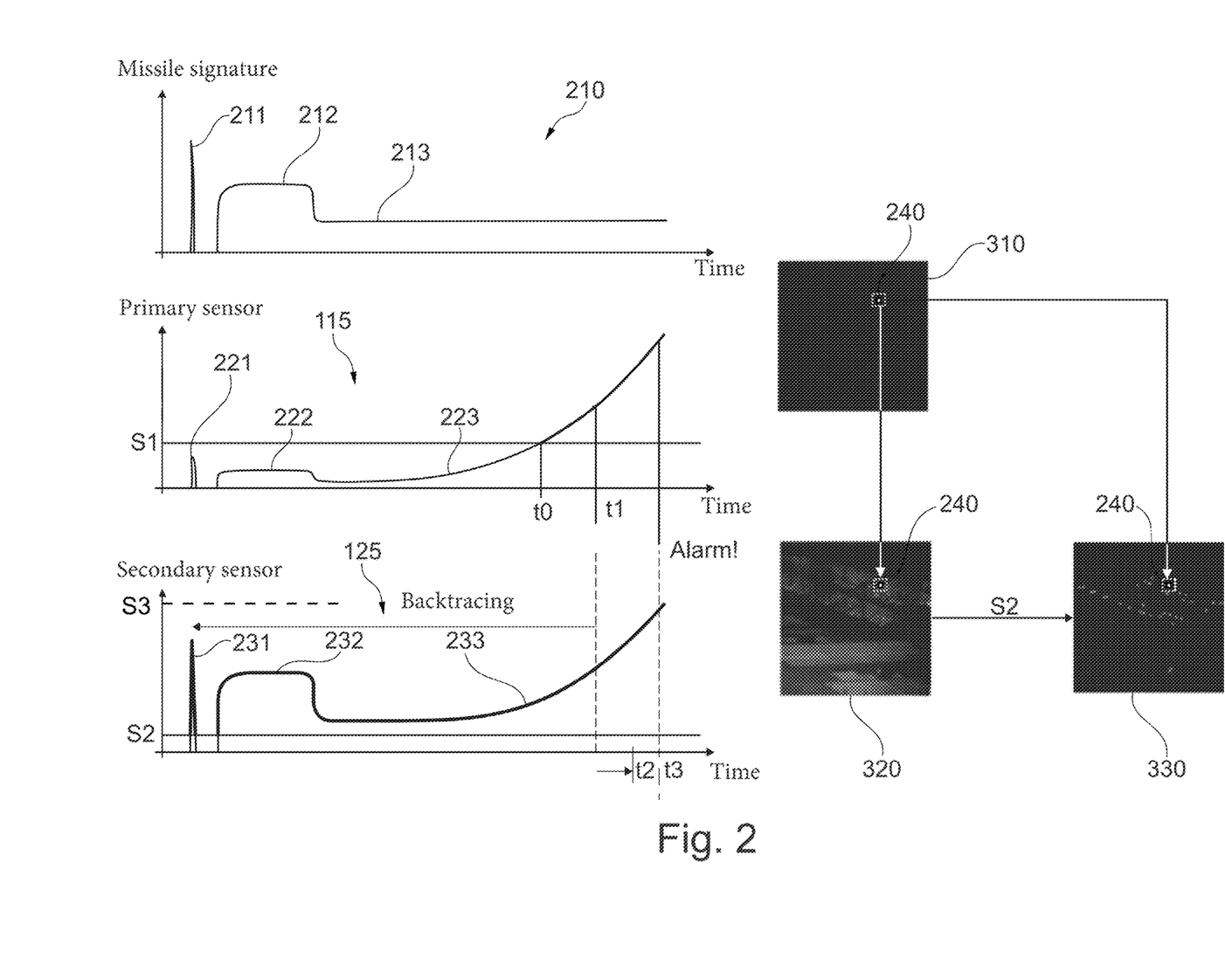
FIG. 2 shows a signal waveform in the primary and secondary sensors and typical image information of primary and secondary sensors to illustrate exemplary embodiments.

FIG. 2 illustrates further details of an exemplary embodiment of the present invention. FIG. 2 shows by way of example a schematic missile signature 210 for a potentially dangerous missile 50 as a function of time. This missile 50 is at least partially detected by the primary sensor 110 (see first detection signals 115) and the secondary sensor 120 (see second detection signals 125).

The missile signature 210 may be, for example, an optical signal generated by the missile 50, which is detectable in the visible, in the IR or in the UV spectral range. The missile signature 210 initially comprises a firing signal 211, which is generated, for example, when a rocket is launched or when the missile is launched. This is followed by an acceleration signal 212 (so-called booster section), which may correspond to an acceleration phase of the missile and is connected to an increased intensity of the generated radiation. Finally, the missile signature 210 shows a flight signal 213 (a so-called sustainer signal) generated over the normal flight time. There are thus shown features that are generated by the different phases of flight of the missile, such as the ejection from the launch tube or the acceleration phase.

The middle of FIG. 2 illustrates the first detection signal 115 detected by the primary sensor 110. The primary detection signal 115 also initially includes a firing signal 221. This is followed in turn by the acceleration signal 222 and finally by the flight signal 223. The flight signal 223 increases with time as the potentially dangerous missile approaches and thus the signal becomes more noticeable. They are the same above-mentioned characteristic signature sections. In the case illustrated by way of example, the signal is initially below the detection threshold. Due to the approaching missile, the signal rises and finally reaches the detection threshold at t0.

The lower portion of FIG. 2 illustrates the second detection signal 125, which is detected or generated by the secondary sensor 120. The second sensor signal 125 also includes the characteristic signals of the abovementioned individual flight sections (a firing signal 231, an acceleration signal 232 and a flight signal 233 which, in turn, increases with time as the missile 50 approaches with time and therefore supplies a stronger signal). In this figure, two thresholds S2, S3 are shown. The higher threshold S3 would be used if the sensor were operated as a pure missile warning sensor. Due to the background of the image, this threshold S3 will be raised to such an extent that the number of objects to be tracked by a tracker does not exceed a certain value in order to keep the processor load and the FAR at an acceptable level. The lower threshold S2 results when only a small area around the position of the pre-alarm determined by the primary sensor in the image content of the secondary sensor is examined. Due to the limited image area, the number of objects to be tracked also remains limited, which, given the same unchanged threshold, leads to a lower processor load and a lower FAR or to a possible lowering of the threshold. By lowering the threshold from S3 to S2, even further away (earlier in the signature) signature features may be observed, which may lead to further improvement of the FAR and POD.

According to exemplary embodiments, the secondary sensor 120 continuously records image information or sensor signals that are above a secondary threshold S2. This recording will take place over a period corresponding to the maximum expected duration of the flight time of the threatening missile. Subsequently, the second sensor signals detected by the secondary sensor may be deleted again or continuously overwritten by new sensor signals.

The primary sensor 110 is triggered by a first detection threshold S1, which defines at which value the first detection signal 115 is to be generated. An exceeding of the first detection threshold value S1 occurs, for example, at the time t0. If, in addition, the declaration threshold D is exceeded, a warning or a pre-alarm may be output by way of example at a time t1. This pre-alarm triggers the secondary sensor 120 to start the traceback. For this purpose, the primary sensor 110 at the time t1 may output a corresponding signal.

Of course, this sequence may also be initiated and controlled by the evaluation or control unit 130. Thus, the evaluation unit 130 may first store the image or detection signals 125 of the secondary sensor 120. If the secondary sensor 120 has also detected a potential detection event at the time t1, i.e. a detection signal exceeds the second threshold value S2, the traceback may be started.

If the detection signals 115, 125 have a same source (the potential missile 50), the features should be synchronized. This may be detected during traceback and used for verification. Due to the greater reach of the secondary sensor, these features may now be further investigated in the past, which improves the quality of the alarm (FAR) over that of the pure primary sensor. This analysis may be completed at a time t2, such that at the time t2 an acknowledgment of the warning of the primary sensor 110 by the secondary sensor 120 is present. Due to the fact that the data of the secondary sensor 120 are already present at the time t1, the evaluation of this data may be started immediately after t1. In comparison to this, a conventional sensor would first have to record further data with its image refresh rate in order to confirm or reject the pre-alarm at time t3. This may result in an earlier confirmation or rejection of the pre-alarm (time t2) when using the secondary sensor according to exemplary embodiments.

On the right-hand side of FIG. 2, an image 310 of the primary sensor 110 is shown by way of example, which illustratively depicts a detection event 240. The detection event 240 is first detected when the primary threshold value S1 is exceeded as detection by the primary sensor 110 (time t0). Upon reaching the declaration threshold D, the detection event 240 represents a candidate for a potential threat (time t1). To confirm this, the traceback is initiated by the secondary sensor 120. As already mentioned, this is performed by the evaluation unit 130 or by the sensors 110, 120 itself.

Image 320 shows the image information captured by secondary sensor 120, which includes a variety of other sources in addition to event 240. Using the second threshold value S2, a filtering may be performed, the result of which is shown in the image 330. However, many of the bright spots visible there belong to false alarm sources (e.g. permanent lights, reflections, or immovable objects) that may be discarded by limiting the viewing area to a local environment around the reported pre-alarm of the primary sensor, if the primary sensor 110 transmits information regarding the location of the event 240.

Since the primary and secondary sensors 110, 120 use different spectral ranges, the sensor signals may in principle be different from each other—even though there will generally be a correlation between the two signals. The primary and the secondary sensor 110, 120 may, as already stated, be two cameras that are sensitive to different spectral ranges. In this way, the advantages of the different spectral bands may be used to combine easy detection and a low false alarm rate with a long reach.

Advantageously, the primary sensor 110 filters out the background signal so that there is already a small false alarm rate. The primary sensor 110 operates like a classic missile detector, but with a reduced declaration threshold for an earlier warning. On the other hand, the secondary sensor 120 advantageously has a greater reach and may be sensitive, for example, in the visible (VIS) spectral range or near-infrared range (NIR) or mid-infrared range (MWIR) or long-wave infrared (LWIR). Detectors in the VIS and NIR spectral range may be used without cooling. Due to the significant miniaturization of these sensors, these sensors could be integrated into existing missile detector sensors.

Figure 3A:
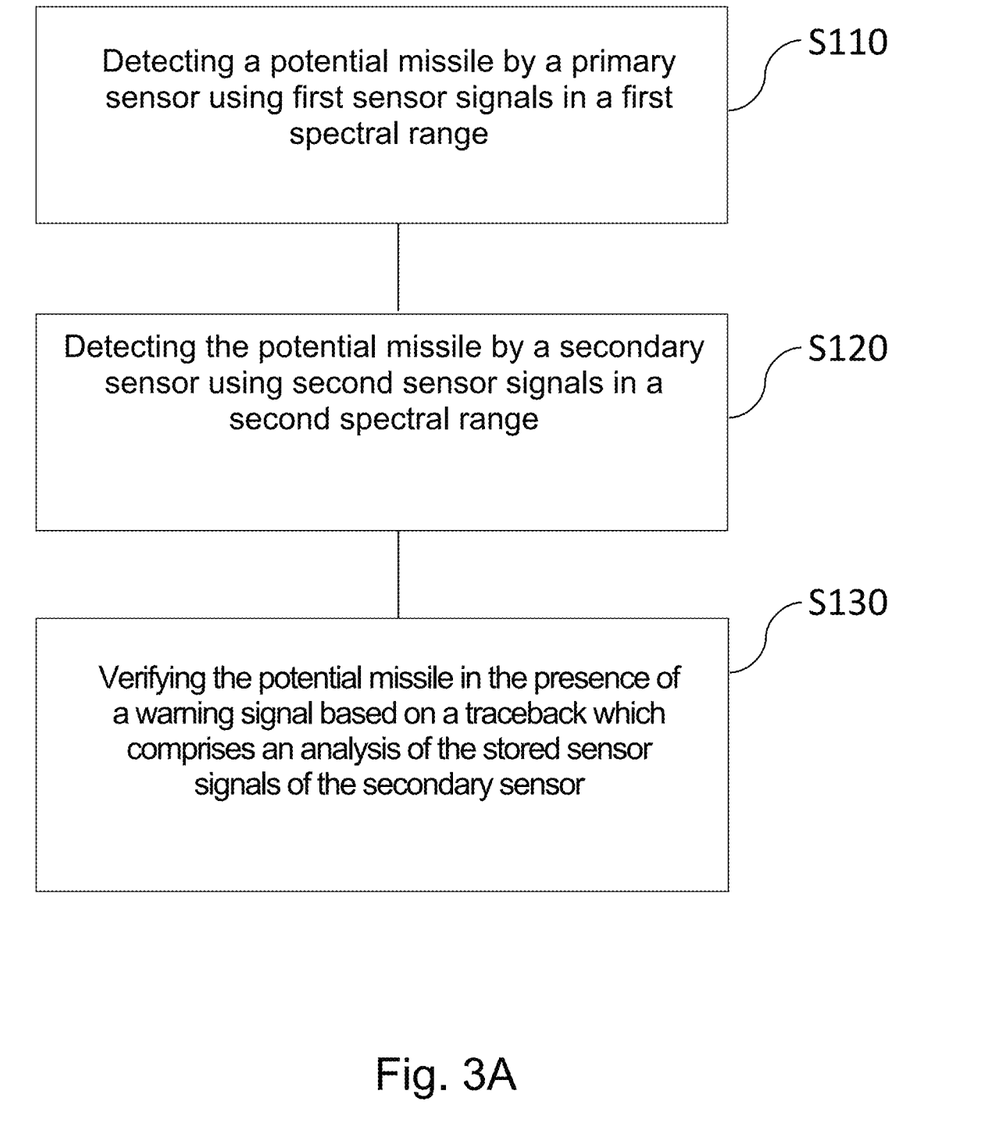
FIGS. 3A, 3B show flowcharts for a method of detecting a potential missile in accordance with exemplary embodiments of the present invention.
Figure 3B:
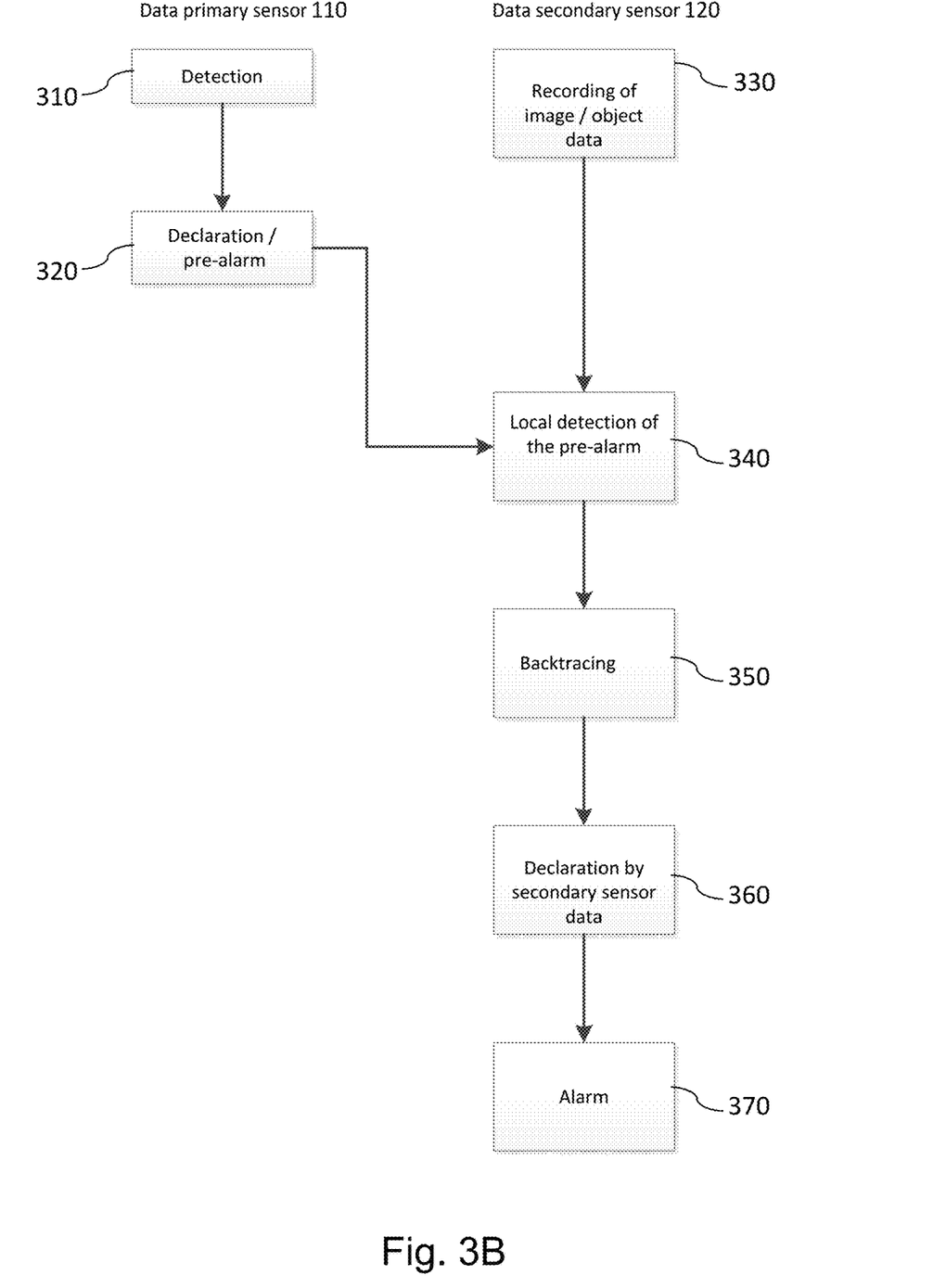

FIG. 3A shows a flow chart for a method for warning of a missile 50 and FIG. 3B shows a flow chart with further advantageous steps. The method comprises the following steps:

Detecting S110, 310 of a potential missile 50 by a primary sensor 110 using first sensor signals 61 in a first spectral range (step 310), wherein detecting comprises comparing the first sensor signals 61 to a threshold S1 and after exceeding a threshold of declaration generating one warning signal of the potential missile 50 (step 320), optionally, simultaneous, rolling recording of the second sensor signals 62 in a second spectral range may occur (step 330), wherein the second sensor signals 62 are continuously received by the secondary sensor 120 and stored for a predetermined period of time, detecting S120 of the potential missile 50 in a localized environment around the position reported by the primary sensor in the recorded data of the secondary sensor (step 340), Verifying S130 of the potential missile 50 when the warning signal is present based on a traceback (step 350) that includes an analysis of the stored sensor signals of the secondary sensor 120 (step 360).

Optionally, an output of the alarm may occur (step 370).

All functions described above may also be implemented as further method steps. Thus, the method according to the exemplary embodiments comprises at least part of the following sequence of a detection and a declaration of missiles (wherein a previously defined hybrid sensor may be used):

1. Detection of the missile 50 by the primary sensor 110.
2. Forming a track in the primary sensor 110.
3. Classification of the track as an alarm or pre-alarm (wherein a pre-alarm is an alarm with a reduced declaration threshold and thus a higher error alarm rate).
4. Transfer of the alarm coordinates or pre-alarm coordinates to the secondary sensor 120.
5. Traceback of the object 50 with regard to time in the recorded data of the secondary sensor 120. The existing background in the image of the secondary sensor 120 does not play a major role, since the starting position of the object 240 is known by the coordinates of the primary sensor 110 and thus not the entire field of view of the secondary sensor 120 is searched for the relevant object 240. Instead, it suffices to search the object 240 within a certain range given by the accuracy of the alarm position, except for an incorrect installation of the primary sensor 110 and the secondary sensor 120 which must possibly be considered.
6. Due to the greater reach of the secondary sensor 120, the relevant object 240 may be traced back much further in time, so that characteristic features may become visible, including, for example, the firing event 211 or the acceleration section 212. This enables an exact classification. In particular, the classification will be better than would be possible by the data of the primary sensor 110 alone.
7. Since the data for the traceback at the time of transfer t2 from the primary sensor 110 already exist and no longer would have to be built with the image refresh rate, in the case of a pre-alarm the traceback and classification may be done much faster than the classification of the primary sensor 110. Compared to a solution with only one sensor, this leads to an earlier alarm, with a constant or lower false alarm rate.

In the case of an image section with a weak background (clutter), as is the case for example in air/air scenarios in the sky, the secondary sensor 120 may also be operated as a missile detector. Compared to the primary sensor 110, this results in a significantly greater reach.

Exemplary embodiments offer the following advantages in particular:

In the case of a lower declaration threshold D1 of the primary sensor 110, this method leads to an improvement in the declaration probability for a constant FAR.

In the case of a constant declaration threshold D in the primary sensor 110, the FAR could be reduced with the same probability of declaration.

Due to the greater reach of the secondary sensor 120, the object (the missile 50) may be traced back to the launch time 211. As a result, the exact position of the shooter is known and may be specified on a map with knowledge of the terrain data (geo-referencing of the launch site).

When knowing the launch site, the time to impact may be estimated (Time to Impact TTI), assuming a velocity profile of the missile.

In the case of the use of a pre-alarm, an improvement of the warning time may be achieved if the data of the secondary sensor 120 may be evaluated correspondingly quickly and the pre-alarm is confirmed faster than could be done by the primary sensor 110.

The greater reach of the secondary sensor 120 could also be used to increase the POD or reduce the false alarm rate when bombarded with non-propelled projectiles. This is the case, for example, if different features of the signatures are visible in the different spectral ranges of the two sensors or if more features may be recognized due to different reachs.

In the case of HFI, it would also be possible to interchange the roles of the two sensors 110, 120 in the event that the secondary sensor would be more suitable for the detection. The secondary sensor 120 would be responsible for the primary detection and declaration of enemy fire while the primary sensor would perform the task of verification of the HFI alarm/pre-alarm.

If the secondary sensor 120 is also operated in parallel as a full-featured missile detector comprising its own tracker and classifier, the system reaches the full reach of the secondary sensor 120 for scenarios with little background.

Secondary sensor 120 does not necessarily require the use of a MWIR sensor which provides an advantage in terms of signal/background ratio (SBR: signal/background ratio) over other background wavelength regions (VIS, NIR, short-wave infrared (SWIR)). In a single-sensor missile detector, a high signal/background signal ratio is necessary to find the relevant object in the entire field of view. Since this approach recognizes the position of the threat, one may work with a significantly lower SBR. For the secondary sensor 120 therefore also sensors are an option for the VIS and NIR range which are cheaper and smaller in size. Since these sensors do not require cryogenic cooling in comparison to MWIR sensors, there is no need for refrigerators, which—due to their moving mechanics—have limitations in terms of service life and use under harsh environmental conditions.

The reach of the hybrid sensor may be greater due to the lower detection threshold of the secondary sensor 120 than for a stand-alone missile detector operating in the same wavelength range as the secondary sensor 120. This would have to be operated due to the necessary reduction of the number of objects with a higher detection threshold, which is at the expense of the reach.

The features of the invention disclosed in the description, the claims and the figures may be essential for the realization of the invention either individually or in any combination.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SYMBOLS

50 Potential missile
61, 62 Sensor signals of different spectral ranges
110 Primary sensor
115 First detection signals
120 Secondary sensor
125 Second detection signals
130 Evaluation unit
135 Alarm
210 Missile signature
211 Firing signal
212 Acceleration signal
213 Flight signal
221, 222, 223 Primary sensor signals of the missile signature
231, 232, 233 Secondary sensor signals of the missile signature
S1, S2, S3 Threshold values
240 Picture representation of a potentially dangerous missile

The invention claimed is:
1. A passive missile detector, comprising:
  a primary sensor configured to detect a potential missile in a first spectral range;
  a secondary sensor configured to detect the potential missile in a second spectral range; and
  an evaluation unit configured to
    receive first detection signals from the primary sensor and generate, responsive to the first detection signals exceeding a declaration threshold value, a warning signal from the potential missile,
    continuously receive and store second detection signals from the secondary sensor for a predetermined period of time, and
    perform, when the warning signal is generated, a verification of the potential missile based on a traceback, wherein the traceback comprises an analysis of the stored second detection signals of the secondary sensor,
    wherein the evaluation unit is configured to store only second detected detection signals from the secondary sensor that are above a further threshold value, and wherein the primary sensor and/or the secondary sensor are configured to perform a local or global segmentation in real time and to transmit only object data to the evaluation unit.
2. The missile detector of claim 1, wherein the evaluation unit is further configured to output at least one of the following alarms:
  a warning after a declaration signal is triggered by the primary sensor when the declaration threshold value is reached;
  an alarm upon verification of the warning by the secondary sensor; and
  an alarm upon reaching a further declaration threshold for the first detection signal, wherein the further declaration threshold is greater than the declaration threshold of the warning.
3. The missile detector of claim 1, wherein the primary sensor is further configured to detect a position or direction of the potential missile upon detection and to pass the detected position or direction to the evaluation unit.
4. The missile detector according to claim 3, wherein the evaluation unit is configured to analyze the stored second detection signals for an area around the position or direction.
5. The missile detector of claim 1, wherein the evaluation unit is further configured to delete second detection signals of the secondary sensor lying outside the predetermined period of time, wherein the predetermined period of time depends on an expected time of flight of the potential missile to an object to be warned by the missile detector, and is in a range between 10 seconds and 60 seconds.
6. The missile detector of claim 1, wherein the evaluation unit is further configured to perform a classification of a potential missile detected by the primary sensor and/or to indicate a probability of absence of a false alarm.
7. The missile detector of claim 1, wherein a potentially dangerous missile has a certain missile signature and the evaluation unit is further configured to compare at least portions of the second sensor signals received by the secondary sensor during analysis with the particular missile signature, in order to classify the missile as potentially dangerous.
8. The missile detector of claim 1, wherein the evaluation unit is further configured to perform the traceback in terms of time up to a possible firing event, wherein the firing event is a temporally localized maximum in the second sensor data or earliest possible sensor signal within the traceback.
9. The missile detector of claim 1, wherein the secondary sensor has a greater reach than the primary sensor.
10. The missile detector of claim 1, wherein
  the first spectral range of the primary sensor is in an ultraviolet range that is not sensitive to solar signals, and
  the second spectral range of the secondary sensor comprises at least one of the following spectral ranges
    visible spectral range,
    near infrared,
    medium infrared, or
    long infrared.
11. A method for warning of a missile, comprising:
  detecting, by a primary sensor, a potential missile using first sensor signals in a first spectral range;
  generating, responsive to the first sensor signals exceeding a declaration threshold value, a warning signal of the potential missile,
  detecting, by a secondary sensor, the potential missile using second sensor signals in a second spectral range, wherein the second sensor signals are received continuously from the secondary sensor and are stored for a predetermined period of time; and
  verifying, when the warning signal has been generated, the potential missile based on a traceback comprising an analysis of the stored second sensor signals of the secondary sensor, wherein an evaluation unit stores only detected second sensor signals that are above a further threshold value, wherein the primary sensor and/or the secondary sensor are configured to perform a local or global segmentation in real time and to transmit only object data to the evaluation unit.

12. The method of claim 11, wherein the steps of detecting comprise detecting first and second sensor signals generated by the missile.

* * * * *